Figure 1:
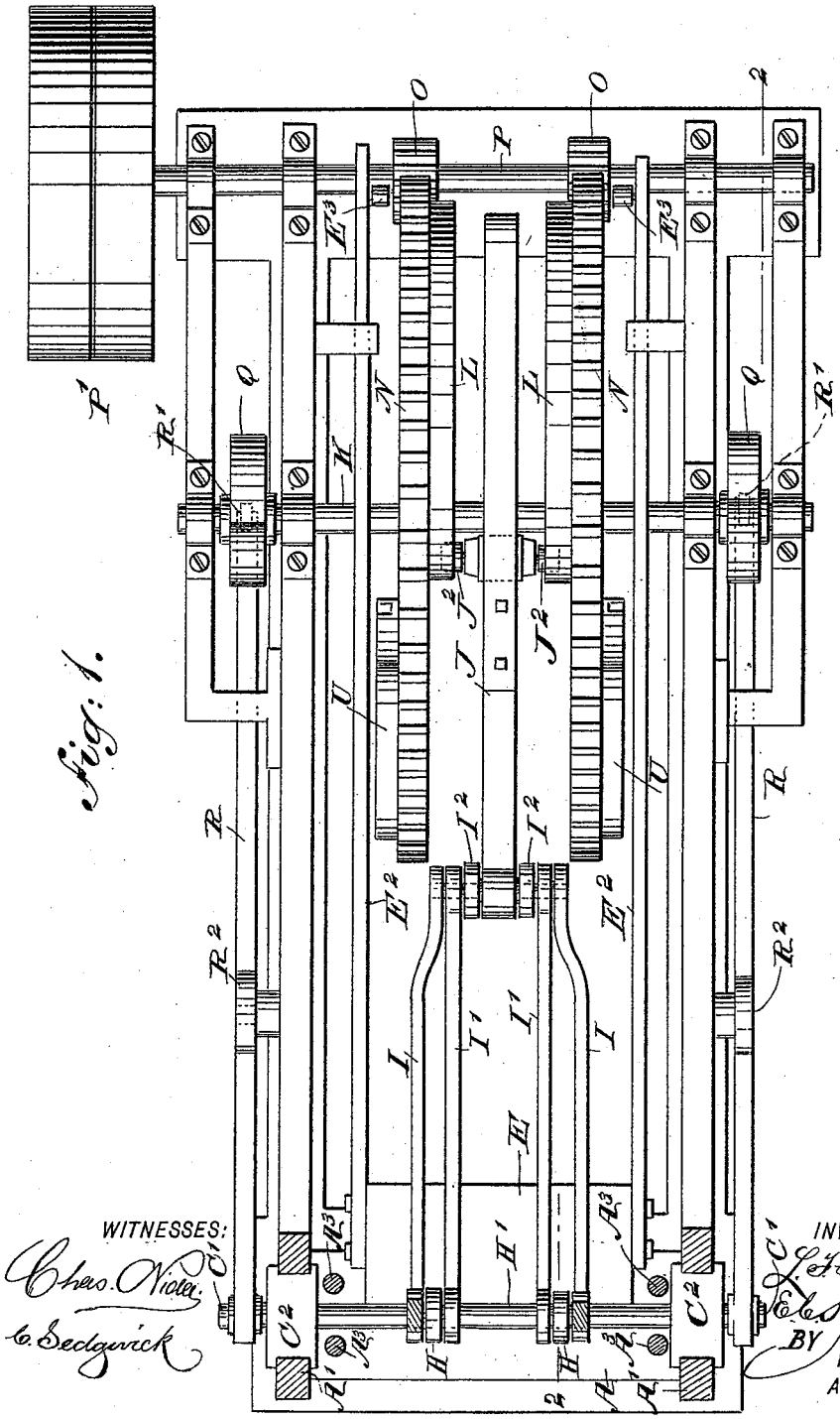

(No Model.) 2 Sheets—Sheet 1.

L. F. GERDING & E. C. HARRISON.
BRICK PRESS.

No. 525,199. Patented Aug. 28, 1894.

WITNESSES:
Chas. Nicolai
C. Sedgwick

INVENTORS
L. F. Gerding
E. C. Harrison
BY Munn & Co
ATTORNEYS.

(No Model.) 2 Sheets—Sheet 2.
L. F. GERDING & E. C. HARRISON.
BRICK PRESS.
No. 525,199. Patented Aug. 28, 1894.
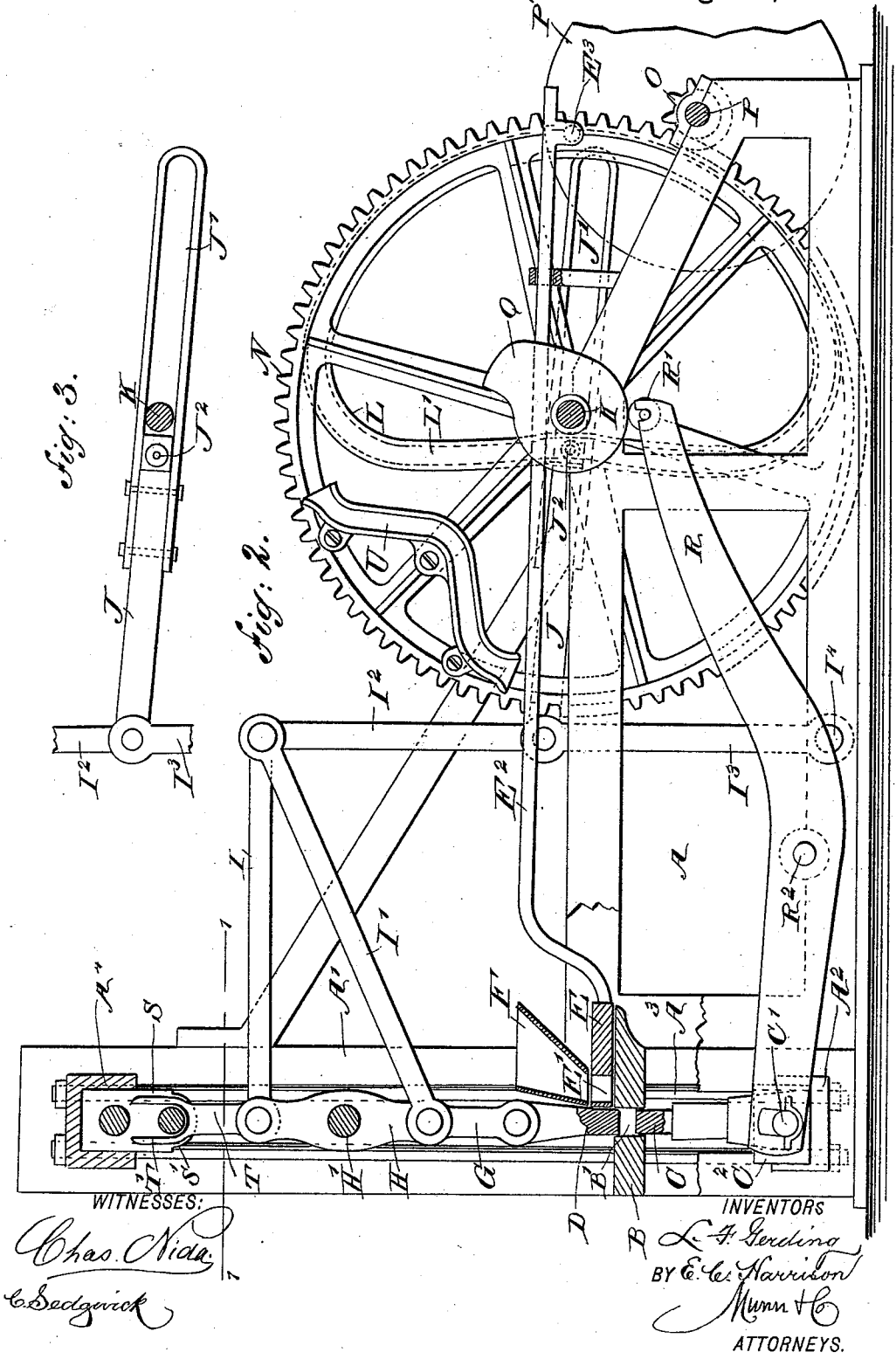
WITNESSES:
Chas. Nida
C. Sedgwick
INVENTORS
L. F. Gerding
BY E. C. Harrison
Munn & Co
ATTORNEYS.

UNITED STATES PATENT OFFICE.

LOUIS F. GERDING AND EDWARD C. HARRISON, OF ST. JOSEPH, MISSOURI.

BRICK-PRESS.

SPECIFICATION forming part of Letters Patent No. 525,199, dated August 28, 1894.

Application filed November 15, 1893. Serial No. 490,991. (No model.)

*To all whom it may concern:*

Be it known that we, LOUIS F. GERDING and EDWARD C. HARRISON, of St. Joseph, in the county of Buchanan and State of Missouri, have invented a new and Improved Brick-Press, of which the following is a full, clear, and exact description.

The invention relates to dry brick presses, and its object is to provide a new and improved brick press, which is simple and durable in construction, very effective in operation and arranged to press the material with sufficient power to form homogeneous bricks.

The invention consists of a lever carrying the plunger, and connected at its ends by links with toggle levers, for turning the said lever to move the plunger in and out of the mold.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a plan view of the improvement with part in section on the line 1—1 of Fig. 2. Fig. 2 is a sectional side elevation of the same on the line 2—2 of Fig. 1; and Fig. 3 is a side elevation of the pitman for actuating the toggle levers.

The improved brick press is provided with a suitably-constructed frame A, supporting at its front end a table B, containing the mold B', in which the material is to be pressed into a brick. The bottom of the mold B' consists of a plunger C, having a vertical movement to raise the brick after being formed by pressure, as hereinafter more fully described. Into the top of the mold B' extends the lower end of the pressing plunger D, which serves to press the material into the mold, the loose material being moved into the mold by a carrier E, having an aperture E', adapted to register with the mold B' and with the discharge end of the hopper F, into which the loose material is placed. The carrier also serves to push the finished brick away from the mold after the plunger D has moved out of contact with the mold, and the other plunger C has pushed the brick upward level with the top surface of the table B.

The pressing plunger D is pivotally-connected by a link G with a lever H, fulcrumed at its middle on a transversely-extending shaft H', journaled in suitable bearings held in the standards A' forming part of the main frame A. The ends of the lever H are pivotally-connected by links I and I' with a lever $I^2$, pivotally connected with a second lever $I^3$, fulcrumed at $I^4$ on the frame A, the said levers $I^2$ and $I^3$ forming toggle levers, to turn the lever H on its shaft H', so as to move the plunger D in and out of contact with the mold B', the lever H and link G also forming toggle levers. The levers $I^2$ and $I^3$ are pivotally-connected with a pitman J, see Fig. 3, extending longitudinally and formed at its rear end with a slot J', through which extends loosely the cam shaft K, journaled in suitable bearings on the main frame A.

On the pitman J are held the friction rollers $J^2$, located opposite each other and traveling in cam grooves L' of the cams L, formed on opposite faces of gear wheels N, secured on the cam shaft K, and in mesh with the pinions O, secured on the driving shaft P, carrying at one outer end fast and loose pulleys P', connected by belt with other machinery, so as to impart a rotary motion to the said driving shaft P. The rotary motion of the shaft P is transmitted by the pinions O to the gear wheels N and consequently to the cam shaft K, the latter rotating at a comparatively low rate of speed.

On the cam shaft K are secured the cams Q, alike in construction and engaging with their peripheral surfaces, friction rollers R' held in the rear ends of levers R, extending forwardly and pivoted at $R^2$ to the main frame A. The front ends of the levers R engage a transversely-extending shaft C', held in bearings $C^2$ fitted to slide vertically in the standards A', the said shaft carrying the bottom plunger C previously mentioned. The bearings $C^2$ when in their lowermost position rest on boxes $A^2$, fitted in the standards A' and connected by bolts $A^3$ with a transverse beam $A^4$, fitted in the standards A' near the upper ends thereof. The beam $A^4$ supports blocks S, carrying a transversely-extending shaft S', loosely engaged by the upper forked end T' of an arm T, pivotally-connected with the upper end of the lever H connected with the links I.

In order to impart a reciprocating motion to the carrier E, I provide the latter with rearwardly-extending rods $E^2$, carrying friction rollers $E^3$, adapted to be engaged by V-shaped cams U, bolted or otherwise fastened to the outer faces of the gear wheels N, so that when the latter are rotated, the said cams U engaging the friction rollers $E^3$, cause a forward and backward sliding of the carrier E, so as to push the formed brick away from the mold, at the same time carrying a charge of loose material to the mold.

The operation is as follows:—When the mold B' has been charged with the material by the carrier E and the latter has receded to its normal position shown in Fig. 2, then the further rotation of the shaft K causes the cams L to cause the pitman J to move rearward, so that the lever H, which has been in an inclined position is gradually moved to a vertical position to cause the plunger D to enter the mold at the same time it causes the arm T to raise the transverse beam $A^4$ which is connected by bolts $A^3$ with the boxes $A^2$ and move the plunger C upward and press the loose material therein to form a brick. When the several parts finally assume the position shown in Fig. 2, the plunger D is in its lowermost position and the pressing of the loose material is completed. The toggle levers $I^2$, $I^3$ then stand in a vertical position with the lever H in the same position, as well as the arm T and plunger C. The strain during this final compressing period, is taken up by the boxes $A^2$ and beam $A^4$, as the two plungers D, C, links G, lever H and arm T now stand in vertical alignment as plainly shown in the said Fig. 2. On the further rotation of the shaft K, the pitman J is moved forward so as to move the toggle levers $I^2$ and $I^3$ into an inclined position, whereby the lever H is turned by the action of the links I and I', so that the said lever assumes an inclined position and the plunger D is withdrawn from the mold. The friction rollers $J^2$ finally pass into the segmental portion of the cam grooves L' so that during nearly one-half revolution of the shaft K, the plunger D remains a suitable distance above the mold B'. During this period, the cams Q act on the friction rollers R', so that the rear ends of the levers R are moved downward while their forward ends swing upward, so that the plunger C is raised, and the brick pressed in the mold, is moved upward until the upper end of the said plunger C is level with the top surface of the table B. At this time the carrier E is pushed forward by the action of the cams U on the friction rollers $E^3$, whereby the brick is shoved forward away from the mold off the table B and the aperture E' in the said carrier and filled with loose material is moved over the mold B', so that the latter is again filled with the loose material, it being understood that during the forward movement of the carrier, the plunger C moves downward into its lowermost position by the action of the cams Q.

By the arrangement described, the material is pressed with sufficient power to form a very solid brick, and at the same time it requires but little power to drive the entire machine.

Having thus fully described our invention, we claim as new and desire to secure by Letters Patent—

1. A brick press, comprising two plungers, a link connected to one of the plungers, a lever fulcrumed in the frame of the machine and pivotally connected to the link, links connected to the said lever—one at each side of the fulcrum of the lever—, the links being also directly connected to each other at one of their ends, toggle levers one of which is pivotally connected with the said links at their point of connection, while the other is pivoted to the frame of the machine, and means for operating the toggle levers, substantially as described.

2. A brick press, comprising an upper plunger, an operating lever fulcrumed in the frame of the machine and connected to the said plunger, an arm pivotally connected with the upper end of the said operating lever, a transverse shaft or rod engaged by the said arm, blocks carrying the said shaft, a transverse beam supporting the said blocks and having sliding movement in the frame of the machine, boxes likewise fitted to slide in the frame of the machine, rods connecting the transverse beam with the said boxes, bearings adapted to rest on the said boxes and capable of a sliding movement in the frame of the machine independent of the said boxes, a lower plunger carried by the said bearings, and means for imparting a sliding movement to the bearings and the lower plunger relatively to, and independently of, the said boxes, substantially as described.

LOUIS F. GERDING.
EDWARD C. HARRISON.

Witnesses:
GEORGE DEVIN,
ADOLPH HENRY.